(12) United States Patent
Ivtsenkov

(10) Patent No.: US 7,848,212 B2
(45) Date of Patent: Dec. 7, 2010

(54) ACOUSTO-OPTIC READING/RECORDING HEAD FOR HIGH-DENSITY OPTICAL DISKS

(76) Inventor: Gennadii Ivtsenkov, 388 Rexford Drive, Hamilton, ON (CA) L8W 3Y7

( * ) Notice: Subject to any disclaimer, the term of this patent is extended or adjusted under 35 U.S.C. 154(b) by 426 days.

(21) Appl. No.: 12/028,831

(22) Filed: Feb. 10, 2008

(65) Prior Publication Data

US 2009/0201788 A1    Aug. 13, 2009

(51) Int. Cl.
*G11B 7/00* (2006.01)
(52) U.S. Cl. .................................. 369/112.27
(58) Field of Classification Search ............. 369/112.27
See application file for complete search history.

(56) References Cited

U.S. PATENT DOCUMENTS

| | | | | |
|---|---|---|---|---|
| 5,822,287 | A * | 10/1998 | Kubota et al. | 369/44.38 |
| 5,850,375 | A * | 12/1998 | Wilde et al. | 369/14 |
| 7,116,613 | B2 * | 10/2006 | Hecht et al. | 369/44.37 |

* cited by examiner

*Primary Examiner*—Wayne R Young
*Assistant Examiner*—Adam R Giesy

(57) ABSTRACT

High-density optical data storage comprising multi-layer optical disc and multi-wavelength reading/recording head, wherein the reading/recording head utilizes a single-mode optic fiber connecting the head with remote short-wavelength laser and acousto-optical (AO) cells that allow precisely positioning the focused light spot on the track and filtering the specific wavelength from multi-wavelength light emitted by the laser built in the head.

3 Claims, 1 Drawing Sheet

ACOUSTO-OPTIC READING/RECORDING HEAD FOR HIGH-DENSITY OPTICAL DISKS

CROSS-REFERENCE TO RELATED APPLICATIONS

Not applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATED-BY-REFERENCE OF MATERIAL SUBMITTED ON A COMPACT DISK

Not Applicable.

FIELD OF THE INVENTION

This invention relates to optical data storage. More particularly, this invention relates to reading/recording head of high-density multi-layer optical storages, such as HD optical disks.

BACKGROUND OF THE INVENTION

Today, in optical storing media is widely used the optical reading based on laser beam reflection from reflecting elements of recording track. The track is spiral-shaped and recording/reading head has the special mechanism that follows the spiral in such a way that optical axis of reading lens is aligned with the center of track. A conventional disk (CD, DVD) usually has a single or double-side layer and data capacity of regular single-side DVD does not exceed 4.7 Gb that is not enough for HD TV. Because technological ability is close to limit (the distance between DVD tracks is 0.34 micrometers, and size of reflecting element is 0.34 micrometers), the only way to increase the data capacity is a multi-layer optical disk.

There are number of methods of creating of multi-layer recording by means of writing of layers placed on different depth in the disk, such as, for example, described in U.S. Pat. No. 4,219,704 issued to Russell Aug. 26, 1980. Here, author proposed a general idea of reading of multi-layer disk by means of "selection of one data track for playback accomplished by changing the focus of the light beam from one data layer to another, or by making the data tracks of optically different materials, such as using different color dyes or different photoluminescent materials, and selectively positioning corresponding color filters in front of the light detectors". In this patent the author does not specify light source of the reading head. The similar idea of multi-layer recordable optical disk is described in U.S. Pat. No. 4,451,915 issued to LaBudde, et al. May 29, 1984.

U.S. Pat. No. 4,908,813 issued to Ojima Mar. 13, 1990 and U.S. Pat. No. 4,973,832 issued to Marchant, et al. Nov. 27, 1990 provide more detailed description of the proposed multi-layer optical disk. In this case, elements of the recorded track contain reflected and transparent parts that allows to laser beam penetrating through upper layer. Laser utilized in the disk reader of this patent emits a number of different wavelengths, wherein single lens having high chromatic aberration focuses laser beam of the first wavelength on the upper layer of the disk and the beam of the second wavelength on the lower layer. Reflected beam is collected by single light sensor. The similar approach is described in U.S. Pat. No. 7,106,664 issued to Hasegawa, et al Sep. 12, 2006. Here, the disk contains number of transparent dielectric layers having different refracting index and different sickness that, according to the authors, allows focusing laser radiation of specific wavelength on the specific layer containing recording track, therefore, according to the authors, providing possibility of multi-layer writing and reading.

Reading head of the existing and proposed in previous patents optical disk readers contains a single or multi-wavelength laser diode mounted directly on the movable head. Such design is suitable for a single-wavelength laser diode only. If the laser diode is a multi-wavelength one (the multi-wavelength light source proposed in mentioned above patents), it can not be properly fit into the reading head because it requires light-separation system sequentially switching the wavelengths; therefore, the head becomes complicated and bulky.

Also, capacity of optical storages is limited by optical resolution that directly depends on wavelength of LD installed in the reading head. The most advanced HD readers, such as BlueRay® HD DVD players utilize short visible (405-nm) wavelength that allows five-time increasing of the disc capacity in comparison with conventional DVD utilizing red (650-nm) LD. Moving in UV region could allow further increasing of optical storage capacity. The main obstacle here is absence of UV LD, which can be directly installed in the reading head. There number of UV lasers that can be used in such storages, but its sizes do not allow directly fitting them in the head. One of the most advanced lasers emitted short UV is 4-th harmonic DPSS laser emitting 266-nm wavelength. Utilization of such laser could additionally increase capacity in about 4 times. To realize this possibility, the author of the present invention proposes a fiber-optic (FO) connection between the laser and the head. In this case the laser can be installed in any convenient place of player/recorder. To keep low divergence of the light beam, the fiber-optical line is a single-mode one.

Another problem of optical storages is a high preciseness of the mechanism positioning the head about the track, which can keep position of the light beam on disk's track. Also, it has to be rigid enough to keep position under some mechanical effects, such as shock and vibration. It becomes even more important for HD recorders/players. There are a number of patents where the authors proposed methods and apparatus that, according to them, can solve this problem. In the U.S. Pat. No. 4,198,657 issued to Kanamaru Apr. 15, 1980 the author propose movable mirror to compensate light spot variation caused the mentioned above effects. Obvious disadvantage of the solution proposed in the U.S. Pat. No. 4,198,657 is a mechanical element—a movable mirror—that requires an actuator and has all disadvantages of mechanical moving elements, such as low speed, overshooting, etc. Another solution was proposed in the U.S. Pat. No. 5,329,507 issued to Nelson et al. Jul. 12, 1994. Here the author proposed an optic waveguides having electro-optical property that allows deflecting the light coming from the guides so changing position of light spot on the disk. Such solution can provide very small deflection angle, therefore it can not be successfully utilized to keep light on the track.

To solve this problem, the author of the present invention proposes an acousto-optical scanner built in a reading/recording head that allows light beam following the track and provide anti-skipping ability.

The present invention alleviate the disadvantages of the previous art by means of utilization of the novel fiber-optic (FO) and acousto-optic (AO) technology that allows precisely positioning the light spot on disk's track, providing fast anti-skipping ability and security of disk information. Also, it allows installing the laser and light-separating filters in any convenient place of the disk reader/recorder, wherein they are optically connected to movable head via a single-mode FO line. Such solution allows significantly increasing disk capacity by means of utilization of short-wavelength UV lasers, which can not be used in conventional optical reading/recording devices, because, despite its small size, it can not be directly built in the reading head.

SUMMARY OF THE INVENTION

A reading/recording head of high-density optical storage, such as HD DVD player and ROM—the object of the present invention—comprises acousto-optical (AO) cell that allows precisely positioning the focused light spot on the track and extracting the specific wavelength from multi-wavelength light emitted by the laser built in the head. Also, the embodiment of the present invention comprises a flexible single-mode fiber-optic line connecting the laser to the reading/recording head.

DRAWINGS

DETAILED DESCRIPTION OF THE PREFERRED EMBODIMENTS OF THE INVENTION

The preferred embodiment of the present invention comprises a reading/recording head utilizing acousto-optical (AO) scanner and filter.

Figure 1:
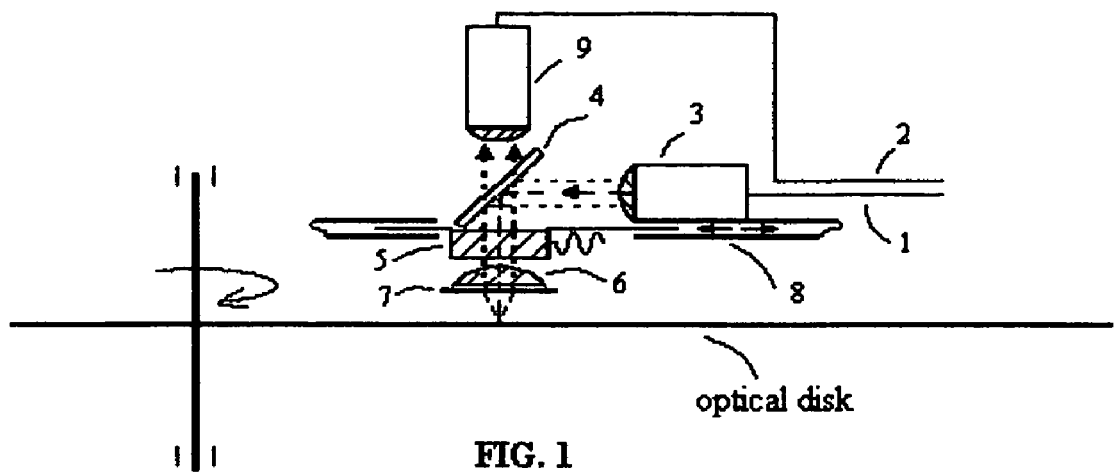
FIG. 1 depicts preferred embodiment of the present invention—the reading/recording head utilizing FO line and AO scanner.

This embodiment is depicted in FIG. 1.

This embodiment comprises a miniature AO scanner built in reading/recording mechanism of a high-density optical disk player/recorder that can provide very precise positioning of the light beam on the disk's track, its programmable scanning, wavelength separation and light modulation.

Features of this reading/writing head include:
Precision automatic positioning of the light spot on the disk, not dependent on the tolerances,
Automatic alignment of the light spot position in any condition, such as vibration, shock, etc., so providing antiskipping features,
Wavelength separation that allows writing the multi-layer disk.
Different shapes of the pit, such as elliptical with axis perpendicular to the track, making steep electrical pulse (instead of gradual one for a circular pit), which produces much better reading.
Programmable variety of tracks on the disk, which can be made by interaction of disk rotation and programmable scanning by built-in AO scanner. It provide high security of the information on the disk, because to read this disk, it is necessary to precisely repeat the written track using the same scanning program (for AO scanner) that was used in recording.

The reading/recording head (FIG. 1) comprises an input single-mode FO line 1, an output single-mode FO line 2, FO collimator 3, prism or mirror with semi-transparent coating 4, one-dimensional AO cell 5, focusing lens 6, diaphragm 7, FO focusing lens 9, the head is mounted on a conventional radial moving mechanism 8.

The optical line 1 connected to external light source (FO laser) transmits radiation to the FO collimator 3. The collimator 3 enlarges the beam up to 2 mm (about) and collimates it. The mirror 4 directs light into AO cell 5. The one-directional AO cell 5 programmable deflects light in the plane that is perpendicular to a spiral track on a disk. The lens 6 focuses the light passed through the cell 5 on the plane of the disk. The diaphragm 7 terminates zero-order of deflected light produced by the cell 5. The conventional radial moving mechanism 8 provides linear radial motion of the head that, together with rotation of the disk, produces a spiral track on the disk. The light reflected from the working layer of the disk is collected by the lens 6, passes through AO cell 5, semi-transparent mirror 4, and it is focused by FO lens 9 inserting the reflected optical signal into the output single-mode FO line 2. Therefore, the AO scanning head can precisely scan the light beam perpendicularly to the spiral track providing the features that are mentioned above.

As an example, the particular embodiment of this reading/recording head can comprise a compact DPSS UV laser (266-nm wavelength), single-mode FO lines 1 and 2 (it could be QSMF-320-2/125 from OZ Optics with core diameter of 2 u). The collimator 3 could contain 19 mm-focus UV lens with clear aperture of 3 mm. The prism (or mirror) 4 with semi-transparent UV-reflecting coating directs the collimated light to AO cell 5. AO cell (6×6×6 mm) made of fused silica deflects the light. The cell 5 has full deflecting angle of 3.5 milliradians in perpendicular direction to the track, so, for 0.15-milliradian divergence of the light beam (close to theoretical limit for 266-nm wavelength), the optical resolution of this deflector will be 17 positions in this direction. The output aspheric lens 6 with focal distance of 0.7-1 mm (f=0.5 for 2 mm-beam) focuses the beam in 0.1-0.15-micron light spot on the surface of the disk. The diaphragm 7 terminates zero orders produced by the AO cell (about 30% of laser output is dissipated in zero order). It should be a square-shaped opening with size of 5×5 u.

The frequency resolution provided by the deflector's electronics of this example is 1024 steps. Therefore, position of the center of the light spot can be controlled with preciseness of 0.0035 u.

The AO scanner provides the switching time (pixel to pixel) or scanning time of 0.3 microseconds (scanning frequency of 3 MHz). So, it can precisely compensate all variations of light spot position caused by vibration, shock, tolerances of the disk and mechanism. For this, it is necessary to have a sensor of track position, and, based on this information, AO scanner will automatically keep the position of the beam direction on the disk.

This embodiment can be implemented in a head of industrial recorder of master disk of high-definition optical disks.

Another Embodiment of the Invention

This embodiment comprises AO head of the previous embodiment together with a multi-wavelength light source and built-in AO filter.

Figure 2:
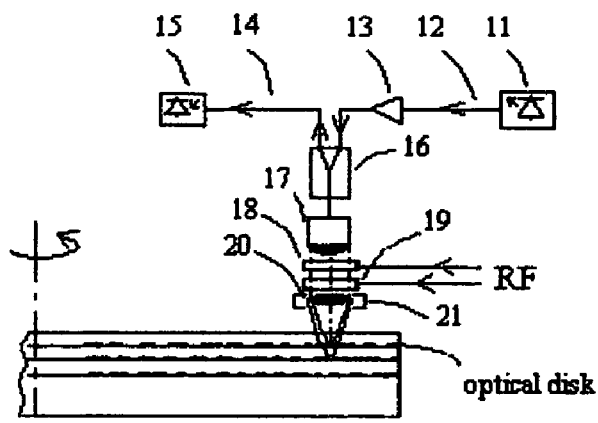
FIG. 2 depicts another embodiment of the reading/recording head additionally comprising AO filter.

The optical diagram of this head is depicted in FIG. 2.

Here, the continuous-wave multi-line light emitted by FO laser 11 runs in FO line 12 and sequentially passes FO isolator 13, FO splitter/combiner 16; it is collimated by FO lens 17 and further enters into AO head containing two AO cells—AO filter 18 and AO scanner 19. AO filter 18 sequentially extracts specific light emission line from the multi-line package of different wavelengths produced by the laser 11 according to RF signal feeding the cell. Lens 20 focuses light spot on a disk's working surface. The reflected light is collimated by lens 20, sequentially passes AO scanner 19, AO filter 18, FO lens 17 that inserts the light signal into optical fiber connecting lens 17 and FO splitter/combiner 16. The light signal passes FO splitter/combiner 16 and is delivered to FO receiver 15 via FO line 14.

Such reading head allows performing sequential reading of the layers that is enough for majority of applications.

For more precise focusing of the focal spot on the layers, the lens 20 can be accompanied with mechanical (piezoelectric) actuator 21 adjusting position of the lens 20 about the disk's working surface.

What is claimed is:

1. A high-density optical data storage apparatus having a reading/recording head comprising; an input fiber-optical (FO) line optically connected to an input fiber-optical (FO) collimator; an output fiber-optical (FO) line optically connected to an output fiber-optical (FO) focuser; a prism or mirror with semi-transparent coating; an one-dimensional acousto-optical cell; an input/output focusing lens; and a diaphragm; wherein said input FO line transmits an optical signal coming from a remote fiber-optical (FO) laser of said high-density optical data storage apparatus to said reading/recording head; wherein, said optical signal coming from said input FO line is collimated by said input FO collimator, reflected from said prism or mirror with semi-transparent coating, and enters said acousto-optical cell which deflects said optical signal precisely positioning a light spot developed by said input/output focusing lens on a working surface of an optical disk; a light signal reflected backward from said working surface of said optical disk is collimated by said input/output focusing lens, passes backward through said acousto-optical cell, passes through said prism or mirror with semi-transparent coating, and is finally inserted, by said output FO focuser, into said output FO line; wherein said reading/recording head is mounted on a conventional radial moving mechanism.

2. A high-density optical data storage apparatus having a reading/recording head comprising: an input fiber-optical (FO) line; an output fiber-optical (FO) line; a fiber-optical (FO) splitter/combiner having a single input/output and two output/inputs; a fiber-optical (FO) collimator/focuser; a first acousto-optical cell; a second acousto-optical cell; a diaphragm and an input/output focusing lens, wherein said high-density optical data storage apparatus comprises: a remote multi-wavelength fiber-optical (FO) laser that is optically connected to said reading/recording head via a fiber-optical (FO) isolator and said input FO line; and a remote fiber-optical (FO) receiver that is optically connected to said reading/recording head via said output FO line; wherein, said input FO line transmits a multi-wavelength optical signal coming from said remote multi-wavelength FO laser of said high-density optical data storage apparatus to said reading/recording head via said input FO line; wherein said multi-wavelength optical signal coming from said input FO line enters one of said two output/inputs of said FO splitter/combiner and leaves said FO splitter/combiner from said single input/output which is connected to said FO collimator/focuser that collimates said multi-wavelength optical signal; said collimated multi-wavelength optical signal a further sequentially passes said first acousto-optical cell, said second acousto-optical cell, said diaphragm, and is focused on a working surface of an optical disk by means of said input/output focusing lens, wherein said first acousto-optical cell, which is a controllable acousto-optical filter, separates a single-wavelength optical signal from said multi-wavelength optical signal, and said second acousto-optical cell deflects said single-wavelength optical signal so precisely positioning a light spit developed by said input/output focusing lens on said working surface of said optical disk is collimated by said input/output focusing lens, passes backward through said second acousto-optical cell and said first acousto-optical cell, and said reflected light signal is finally inserted into said output FO line by means of said FO collimator/focuser delivered to said remote FO receiver; wherein said reading/recording head is mounted on a conventional radial moving mechanism.

3. The reading/writing head of claim 2 additionally comprising an actuator, which performs precise focusing of the light spit on a chosen layer of the optical disk, wherein said optical disk has two or more layers.

* * * * *